April 3, 1956

A. J. HAMMOND 2,740,155

AUTOMOBILE HOOD HINGE

Filed Dec. 20, 1951

2 Sheets-Sheet 1

INVENTOR.
Almerion J. Hammond
BY
Willito, Helwig & Bailto
ATTORNEYS

April 3, 1956  A. J. HAMMOND  2,740,155
AUTOMOBILE HOOD HINGE
Filed Dec. 20, 1951  2 Sheets-Sheet 2

INVENTOR.
Almerion J. Hammond
BY
Willets, Helwig & Baillio
ATTORNEYS

United States Patent Office 2,740,155
Patented Apr. 3, 1956

2,740,155

AUTOMOBILE HOOD HINGE

Almerion J. Hammond, Lansing, Mich., assignor to General Motors Corporation, Detroit, Mich., a corporation of Delaware Application December 20, 1951, Serial No. 262,587

6 Claims. (Cl. 16—163)

This invention relates to supporting means for a movable member, and more particularly to an improved hood hinge for an automobile.

In automobiles having a front-opening or "alligator" type hood the hood is usually supported by a pair of hinges located one near each rear corner of the hood. These hinges each comprise a base plate secured to the dash or firewall of the automobile body, and a pair of links each having one end pivotally mounted on the base plate and having the other end pivotally secured to the hood. A heavy tension spring operates between one of the links and the base plate or other fixed portion of the body to provide an overcenter action to hold the hood open or closed, as the case may be. This spring exerts a force tending to distort the link upon which it operates, and consequently to throw the hood out of alignment at the rear end so that it is difficult to mount the hood on the body so that it fits properly with the fenders, grille, and body shroud.

The present invention provides a novel arrangement whereby the hood supporting link is not connected directly with the spring, but there is provided an operating link which is connected directly with the spring and which is interconnected with the supporting link in a manner to provide unitary pivotal movement of said links when the hood is opened and closed, and to permit independent movement of the operating link in response to the distortive force of the spring, so that, if the spring distorts the operating link, the supporting link and the hood are not affected.

Figure 1:
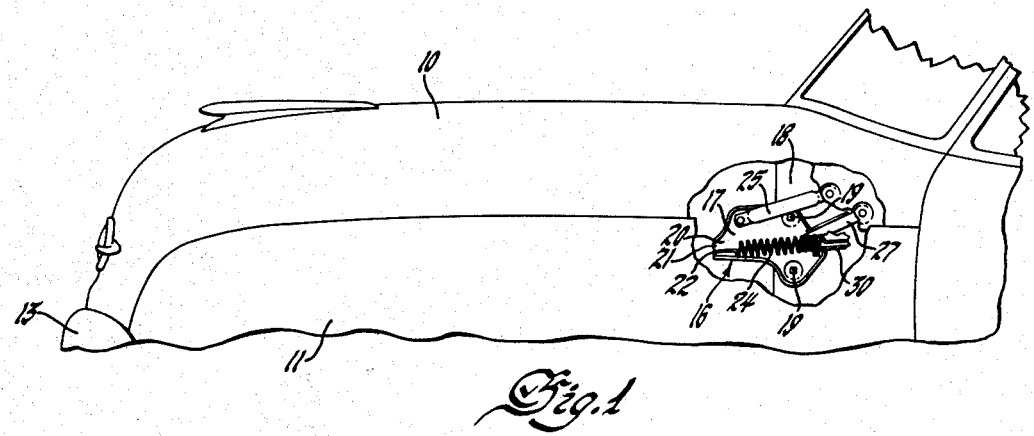
Figure 2:
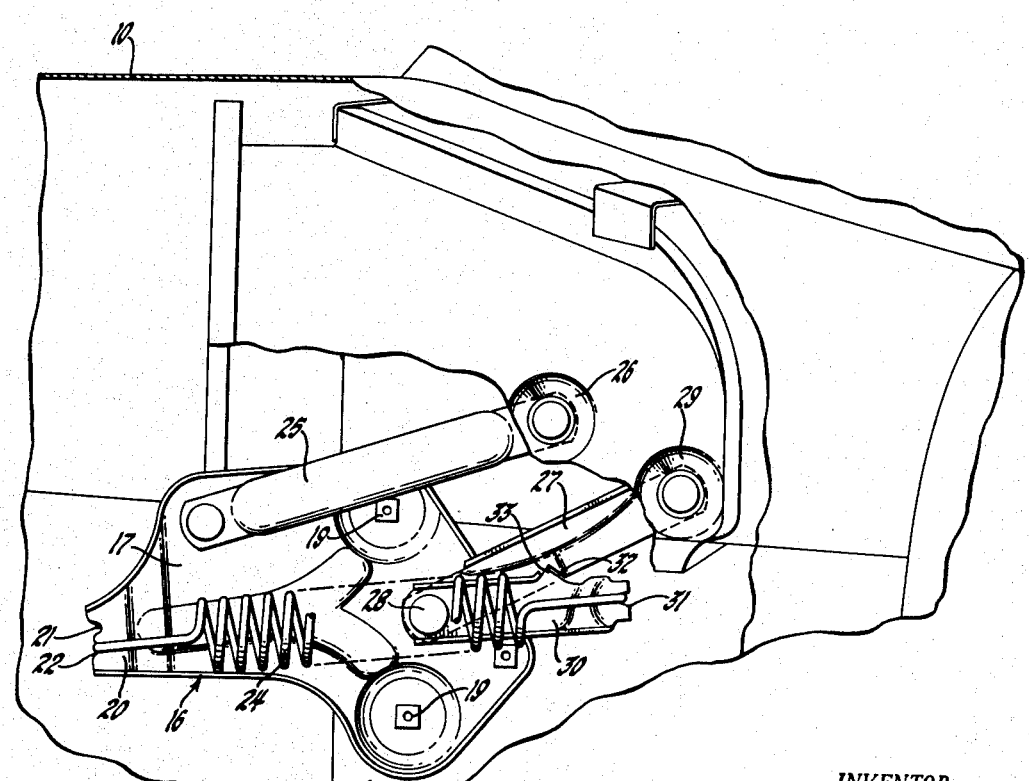
Figure 3:
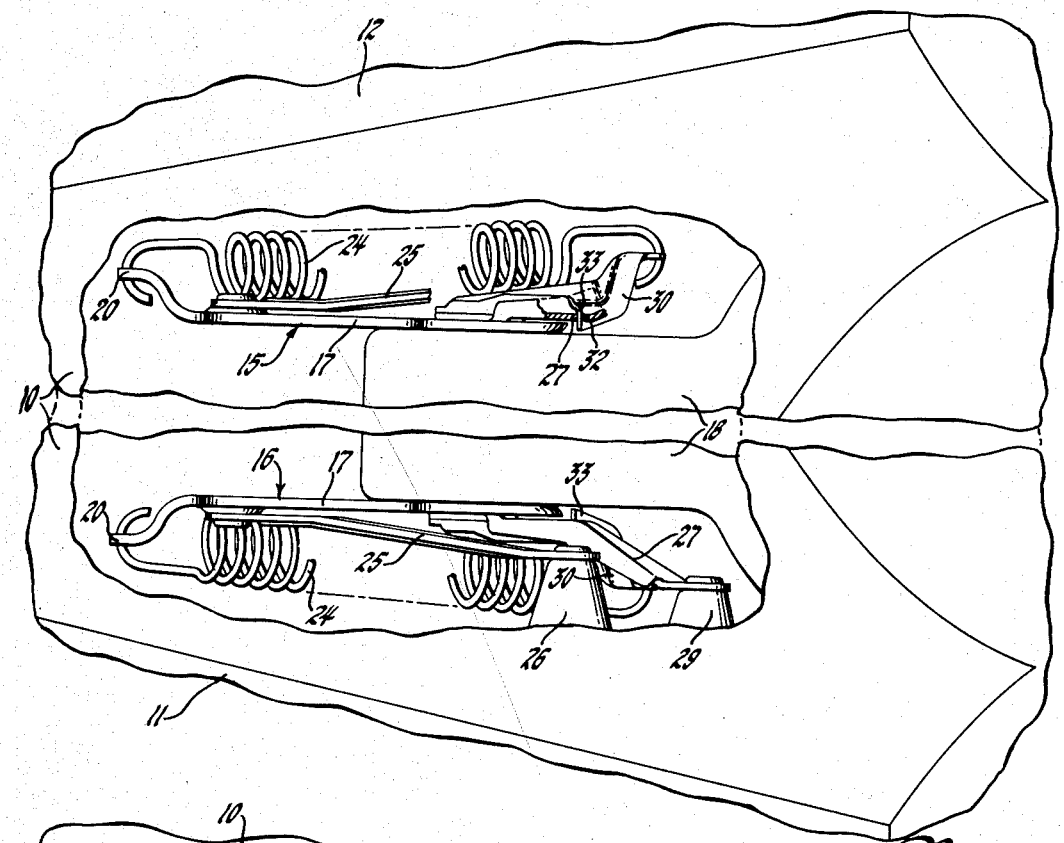
Figure 4:
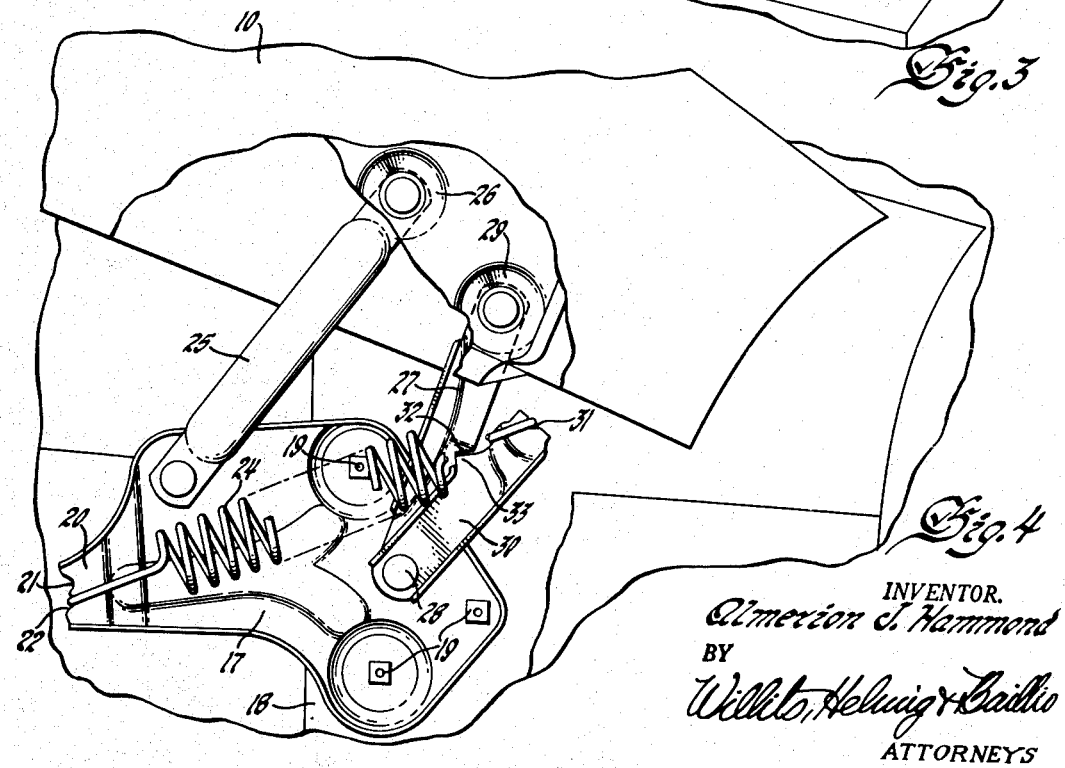

Other features and advantages of the invention will be apparent from the following description, and from the drawings in which:

Fig. 1 is a fragmentary side elevational view of an automobile having my improved hood hinge, portions of the hood and fender being broken away to show underlying structure; Fig. 2 is an enlarged fragmentary view of a portion of the structure shown in Fig. 1 with the hood in closed position; Fig. 3 is a top plan view of a portion of the automobile hood, parts being broken away; and Fig. 4 is a side elevational view similar to Fig. 2, but with the hood in open position.

Referring now more particularly to the drawings, the automobile illustrated in Fig. 1 has a front-opening or "alligator" hood 10 which, during the assembly of the automobile body, is fitted on to fenders 11 and 12 and a grille structure 13.

The hood 10 is connected to the body by means of hood hinges designated generally as 15 and 16 in Fig. 3, each hinge being located near a rear corner of the hood. Inasmuch as the hood hinges are identical in structure, only one hinge will be described in detail, and the same reference characters will be used to designate similar parts of each hood hinge.

Each hinge comprises a base plate 17 which is bolted or otherwise rigidly secured to the dash or firewall 18 of the automobile, bolts 19 being illustrated in the drawings to secure the base plate 17 to the firewall. If desired the plate may be formed by and be an integral part of the firewall. At its forward end the plate 17 has a projecting portion 20 which is bent outwardly away from the longitudinal center line of the automobile and which is provided with notches 21 and 22 for anchoring one end of a heavy hood hinge spring 24.

A first supporting link 25 has one end pivotally mounted on the plate 17 adjacent the front end of the said plate, and the other end of this link is secured to the hood through pivotal connection with a boss 26 (Fig. 3) which projects from the inner surface of the hood. A second supporting link 27 has one end pivotally mounted on the base plate 17 at a point adjacent the rear end of said base plate, a bolt or rivet 28 providing a pivotal axis for the link 27. The other end of the link 27 is secured to the hood through pivotal connection with a boss 29 (Fig. 3) which projects from the inner surface of the hood, the bosses 26 and 29 being secured to the hood by welding or other means. In Fig. 3, the bosses have been omitted from the right side of the hood in order to simplify the drawings. The links 25 and 27 preferably are stamped from sheet metal.

In prior uses of this general type of hood hinge, one end of spring 24 is connected directly to link 27 while the spring is under tension. Since the spring is quite heavy in order to provide sufficient force to operate the hood properly, and since the link 27 preferably is a sheet metal stamping, the force of the spring very often distorts the link 27 out of its normal plane of pivotal movement, thereby distorting the hood 10 at the rear end and making it difficult to fit the hood properly on the body.

I have devised and am herein disclosing and claiming a novel construction wherein the spring 24 is not connected directly with the hood supporting link 27. An operating link 30 is pivotally mounted on the bolt 28 so that it has a pivotal axis common with the supporting link 27, the link 30 having at its free end a notch 31 for connecting the rear end of the spring 24 with said spring under tension. Means are provided interconnecting the links 27 and 30 to provide for unitary pivotal movement of said hinges as the hood is opened and closed and to permit independent lateral movement of the operating link 27. This interconnection is provided by a slot 32 extending inwardly from the edge of the link 27, said slot being so placed that it is not tangent to a circle having the pivotal axis of the links 27 and 30 at its center. The link 30 is provided with a bent lug 33 which is received in the slot 32 so that the links 27 and 30 are interconnected for unitary pivotal movement about the axis provided by the bolt 28, but the link 30 may move independently of the supporting link 27 in response to distortive forces exerted by the spring 24.

According to the invention the spring 24 is operative upon only the supporting link 27 and the hood is held open or closed, as the case may be, by the lug and slot interconnection between the links 27 and 30, but any distortion out of the plane of normal pivotal movement of the links affects the link 30 only, and the link 27 and hood 10 are not distorted, so that the hood may be properly fitted to the automobile body.

While I have shown and described one embodiment of my invention, it is subject to many modifications. Changes, therefore, in the construction and arrangement may be made without departing from the spirit and scope of the invention as set forth in the appended claims.

I claim:

1. Supporting means for a movable closure member, comprising: a supporting link connected to the movable closure member; an operating link; means for pivoting said links on a common axis; and means non-removably interconnecting said links at a point spaced from said axis to provide for unitary pivotal movement of said links about said axis and to permit independent distortion of at least said operating link in directions generally parallel to said axis.

2. Apparatus of the character claimed in claim 1, wherein said interconnecting means comprises an opening formed in one of said links and a projection on the other link received in said opening.

3. Supporting means for a movable closure member, comprising: a supporting link connected to the movable closure member; and operating link; means for pivoting said links on a common axis; and means non-removably interconnecting said links at a point spaced from said axis to provide for unitary pivotal movement of said links about said axis and to permit independent distortion of said operating link in directions generally parallel to said axis, said interconnecting means comprising a slot formed in one of said links and extending diagonally towards said axis and a projection on the other link received in said slot.

4. An automobile hood hinge of the character described, comprising: a base plate; a first supporting link having one end pivotally mounted on said base plate and the other end connected to the automobile hood; a second supporting link having one end pivotally mounted on said base plate and the other end connected to the automobile hood; an operating link having one end pivotally mounted on said base plate on an axis common with the pivotal axis of said second supporting link; a spring connected to said base plate and the free end of said operating link and exerting a force tending to distort said operating link out of its plane of pivotal movement; and means interconnecting said operating and second supporting links to provide for unitary pivotal movement of said last mentioned links and to permit independent movement of said operating link in response to said distortive force.

5. An automobile hood hinge of the character described, comprising: a base plate; a sheet metal supporting link having one end pivotally mounted on said base plate and the other end connected to the automobile hood; a sheet metal operating link having one end pivotally mounted on said base plate on an axis common with the pivotal axis of said supporting link; a heavy tension spring connected to said base plate and the free end of said operating link and exerting a force tending to distort said operating link out of its plane of pivotal movement; and means interconnecting said operating and supporting links to provide for unitary pivotal movement of said operating and supporting links and to permit independent movement of said operating link in response to said distortive force, said interconnecting means comprising an opening formed in one of said links and a projection on the other link received in said opening.

6. An automobile hood hinge of the character described, comprising: a base plate; a first supporting link having one end pivotally mounted on said base plate and the other end connected to the automobile hood; a second supporting link having one end pivotally mounted on said base plate at a point spaced from the pivotal mounting of said first link and having the other end connected to said automobile hood; a sheet metal operating link having one end pivotally mounted on said base plate on an axis common with the pivotal axis of said second supporting link; a heavy tension spring connected to said base plate and the free end of said operating link and exerting a force tending to distort said operating link out of its plane of pivotal movement; and means interconnecting said second supporting link and said operating link to provide for unitary pivotal movement thereof and to permit independent movement of said operating link in response to said distortive force, said interconnecting means comprising a slot formed in one of said last-mentioned links and extending diagonally towards said axis and a lug on the other one of said last-mentioned links received in said slot.

References Cited in the file of this patent

UNITED STATES PATENTS

| Number | Name | Date |
|---|---|---|
| 94,900 | Leonard | Sept. 14, 1869 |
| 170,887 | Meyers | Dec. 7, 1875 |
| 907,342 | Greenlunp | Dec. 22, 1908 |
| 1,764,875 | Hultgren | June 17, 1930 |
| 1,853,708 | Teaf | Apr. 12, 1932 |
| 2,185,213 | Glaud-Mantle | Jan. 2, 1940 |
| 2,204,991 | Haltenberger | June 18, 1940 |
| 2,215,606 | Dunn | Sept. 24, 1940 |
| 2,540,761 | Sjoboen | Feb. 6, 1951 |